United States Patent [19]

Hillman et al.

[11] Patent Number: 5,560,881
[45] Date of Patent: Oct. 1, 1996

[54] APPARATUS FOR PRODUCING A FISSURED, ACOUSTICAL CEILING PANEL AND METHOD FOR MANUFACTURING SAID APPARATUS

[75] Inventors: Theodore E. Hillman, Cloquet, Minn.; Jared R. Kies, Perrysburg, Ohio

[73] Assignee: USG Interiors, Inc., Chicago, Ill.

[21] Appl. No.: 255,605

[22] Filed: Jun. 8, 1994

[51] Int. Cl.$^6$ ............................ B26F 01/24; B29C 39/10
[52] U.S. Cl. ................. 264/265; 29/527.1; 29/895.213; 29/895.3; 83/660; 83/868; 264/277; 264/278; 264/225; 492/30
[58] Field of Search ................ 83/660, 867, 868; 29/895, 895.2, 895.21, 895.213, 895.3, 895.31, 527.1; 492/30, 28, 31, 37, 38; 264/277, 278, 279, 219, 225, 265, 138, 161; 162/205, 286

[56] References Cited

U.S. PATENT DOCUMENTS

| | | | |
|---|---|---|---|
| 2,924,863 | 2/1960 | Chavannes | 264/277 |
| 3,202,025 | 8/1965 | Carlson et al. | 83/660 |
| 3,461,754 | 8/1969 | Griffen | 83/660 |
| 3,470,978 | 10/1969 | Wagtskjold et al. | 181/33 |
| 3,538,797 | 11/1970 | Wagtskjold et al. | 83/867 |
| 3,682,028 | 8/1972 | Clayton et al. | 83/660 |
| 3,706,250 | 12/1972 | Herd | 83/660 |
| 4,037,499 | 7/1977 | Hillman | 83/101 |
| 4,083,273 | 4/1978 | Hillman et al. | 83/660 |
| 4,326,909 | 4/1982 | Slavik | 83/660 |
| 4,459,891 | 7/1984 | Kies et al. | 83/660 |
| 4,469,656 | 9/1984 | Ishii | 264/87 |
| 4,530,653 | 7/1985 | Ishii | 425/363 |
| 4,941,949 | 7/1990 | Luszczak | 162/310 |

FOREIGN PATENT DOCUMENTS 3-201997 9/1991 Japan .......................... 492/30

Primary Examiner—Robert Davis
Attorney, Agent, or Firm—John M. Lorenzen; David F. Janci

[57] ABSTRACT

An apparatus for producing a fissured, acoustical ceiling panel wherein the pins used to fissure the panel are roll applied thereto. The pins are embedded in flexible, resilient polymeric plates, and a plurality of the plates are attached to a rotary drum which is used to apply the fissuring pins to the surface of the panel. The invention also includes the method for manufacturing the polymeric plates which are molded and formed with the fissuring pins embedded therein.

19 Claims, 3 Drawing Sheets

APPARATUS FOR PRODUCING A FISSURED, ACOUSTICAL CEILING PANEL AND METHOD FOR MANUFACTURING SAID APPARATUS

FIELD OF THE INVENTION

This invention relates to apparatus for producing a fissured, acoustical ceiling panel wherein the pins used to fissure the panel are roll-applied thereto after the panel is dried. The invention also relates to the method for manufacturing the rotary drum or roll used to fissure the panel.

BACKGROUND OF THE INVENTION

In U.S. Pat. No. 3,470,978, there is disclosed apparatus for punching acoustical openings into mineral fiberboard. As stated therein, punching such acoustical openings in fiberboard had previously been accomplished commercially by using flat press plates bearing pins which were pressed into the surface of the board.

The '978 patent discloses apparatus for the continuous and rapid punching of acoustical openings into mineral fiberboard by means of a rotating drum. This rotating drum apparatus employs spaced pins which are firmly anchored in the steel drum in combination with a layer of compressed sponge rubber provided about the outer circumference of the drum. The sponge rubber layer functions by holding the fiberboard in position on the conveyor and to remove the board from the pins as they rotate away from the board.

However, the apparatus disclosed in the '978 patent employs pins which are mounted in curved metal plates. The curved metal plates require precision drilled holes of various sizes to accommodate the different pins, and the underside of the plates must be countersunk for the pin heads. The plates must also be drilled for mounting holes which are used to attach the plates to the main rotating drum. The holes for the pins must be precision-sized in order to hold the pins firmly in place. These and many other time consuming and expensive labor steps are involved in manufacturing the rotating drum fissuring apparatus. In addition, there must be spaces between the pins which limits the apparatus to forming hole patterns with spaces between the holes.

It is an object of this invention to provide a novel rotating drum apparatus for fissuring acoustical ceiling panels with unlimited pattern flexibility.

It is another object of this invention to provide a rotating drum having fissuring pins which are embedded in flexible, resilient, but incompressible, polymeric plates which surround the rotating drum.

It is still another object of this invention to provide a rotating drum having fissuring pins arranged in patterns wherein a plurality of pins are adjacent and contiguous, with varying numbers of pins in such arrangement.

It is a further object of this invention to provide a method for manufacturing the flexible, resilient polymeric plates having the fissuring pins embedded therein.

SUMMARY OF THE INVENTION

An apparatus for producing fissured acoustical ceiling panels has been developed employing a rotating drum or roll wherein a plurality of flexible, resilient, but incompressible, polymeric plates having fissuring pins embedded therein surround the drum or roll. Headless pins are used and are arranged in patterns wherein a plurality of pins are adjacent and contiguous, with varying numbers of pins in such arrangement. The plates of flexible, resilient polymeric material with the pins embedded therein are prepared in a master mold. In a preferred form, these plates of polymeric material have scalloped edges so that they can be pieced together on the drum or roll in interlocking fashion for pattern continuity. A plurality of plates are placed on the surface of the drum or roll to cover the surface completely. It is preferred that the plates be molded slightly undersize whereby they can be stretched into place on the drum to eliminate substantially the join lines.

DETAILED DESCRIPTION OF THE INVENTION

In accordance with this invention, a fissure pattern is provided for acoustical ceiling panels by employing a rotary drum or roll apparatus having headless pins embedded in a plurality of flexible, resilient, but incompressible, polymeric plates which surround the drum or roll. The pins, which may be made of heat-treated, high carbon steel, are arranged into an assembly jig, i.e. a flat silicone rubber mold with holes in it which define the fissure pattern, and the flexible, resilient polymeric material is cast around the exposed ends of the pins in a master mold. The polymeric material, such as an epoxy resin or a polyester-urethane copolymer, is in liquid form and is poured into the master mold to form the flexible, resilient polymeric plates with the pins embedded therein. Metal bushings or mounting bosses are also embedded in the polymeric material as means to attach the plates to the rotary drum.

Figure 1:
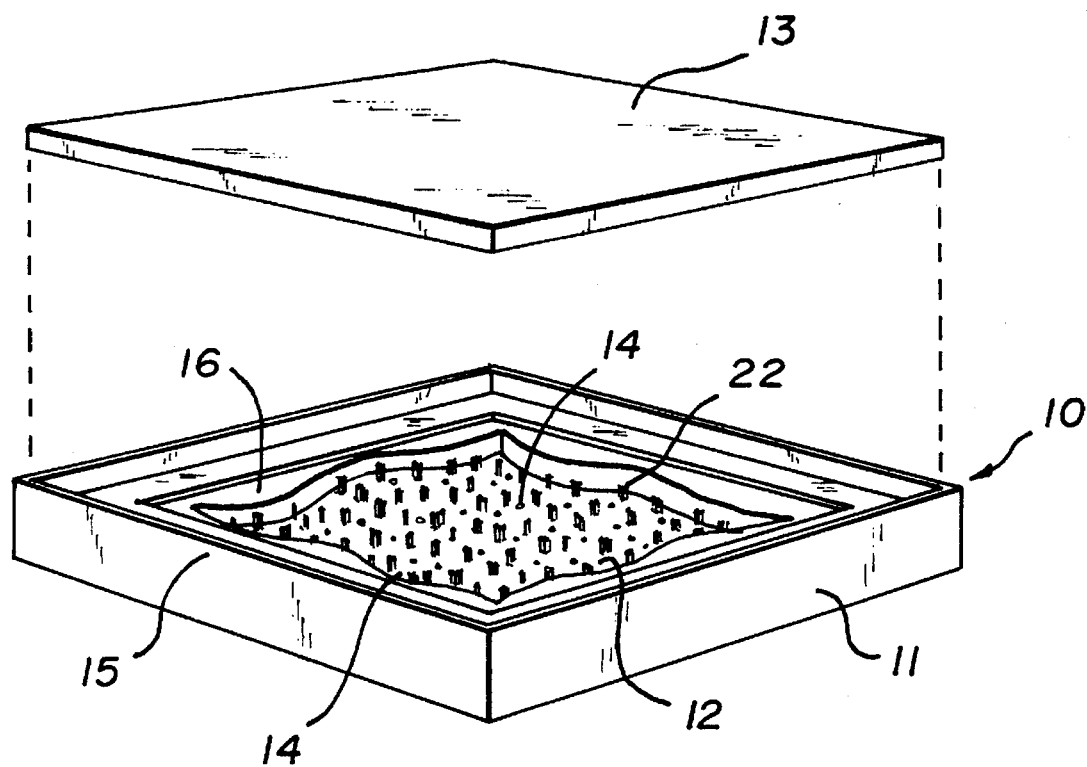
FIG. 1 is a sketch of a master mold which may be used to make the flexible, resilient polymeric plates with the pins embedded therein which surround the rotating drum.

This process is illustrated in FIG. 1 which is a sketch of a master mold used to make the flexible, resilient polymeric plates with the fissuring pins embedded therein. In FIG. 1, the master mold (10) comprises a cavity pan or container (11), a flat silicone rubber (elastomeric) mold (12), and a top cover plate (13). Holes (14) (shown by dots in FIG. 1) are pre-formed in the silicone mold (12) to define a preselected fissure pattern, with the height of the cavity pan side (15) and the depth of the holes (14) determining the length of the pins (22) embedded in the polymeric material and the pin length projecting above the surface of the polymeric plate. The pin holes (14) may be formed all the way through the silicone rubber mold (12) in which case the thickness of the mold (12) will determine the length of the pin protrusion, if the pins are inserted into the holes into contact with the bottom of the cavity pan.

Figure 5:
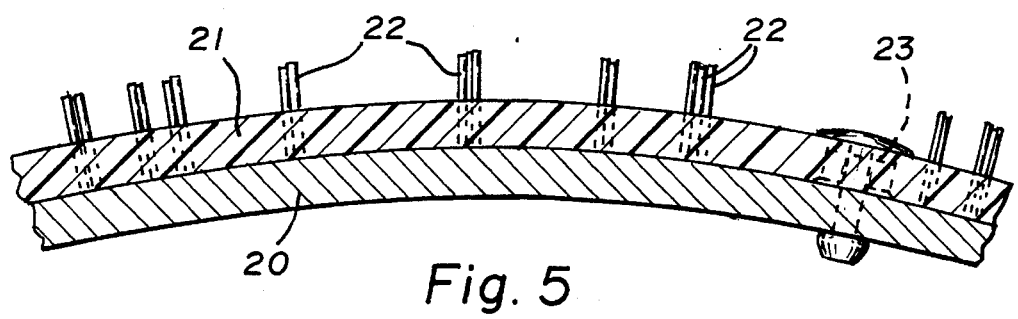
FIG. 5 is a cross-sectional view, taken along the line 5—5 of FIG. 4.

In general, the pins (22) may extend into the mold (12) for a depth of about ⅛ inch to about ⅜ inch, though this is a matter of choice. The pins (22) can extend into the holes (14)

to any depth according to how far it is desired for them to extend from the surface of the polymeric plate (21). The depth of the holes (14) is made accordingly. As illustrated in FIG. 5, all of the pins (22) extend the same length from the surface of the polymeric plate (21), however, the length of the pins (22) extending from the surface of the plate (21) can be varied if desired.

It should be noted that the silicone rubber mold (12) and the cavity pan (11) are designed to provide a land area (16) around the perimeter of the polymeric plate (21). The land area (16) is used to clamp the polymeric plate (21) on a curved surface during curing. After curing, the land area (16) may be removed by trimming with a sharp knife. Since a plurality of polymeric plates (21) are used to cover the rotary drum (20), it is preferred to mold scalloped edges (25) into the polymeric plate (21) in the master mold as shown in FIG. 1. The scalloped edges (25) enable the polymeric plates (21) to be placed on the drum (20) in interlocking fashion for pattern continuity. Alternatively, the polymeric plate (21) can be molded without scalloped edges, and the plate (21) can be trimmed after curing to provide the scalloped edges (25). Since the polymeric material is tough and hard to cut, the trimming procedure can be facilitated by making a shallow cut in the form of scalloped edges in the polymeric plate (21) after it is partially cured and before it is placed on the curved surface for complete curing. After complete curing, the edges are trimmed with a sharp knife, and it has been found helpful to use a mask over the plate (21) as a guide in trimming the edges to provide a scalloped shape.

After all of the pins (22) have been inserted into the pin holes (14) in the silicone rubber mold (12), the mold containing the pins is placed in the cavity pan (11). The pins (22) and the surface of the mold (12) are sprayed with a liquid resin binder to promote adhesion of the polymeric material to the pins. The mounting bosses (23) (see FIGS. 4 and 5) are also sprayed with the liquid resin binder and are then placed on the silicone rubber mold (12). The resin binder holds the mounting bosses (23) in place on the mold (12) when the liquid polymeric material is poured into the master mold (10). After the liquid polymeric material is poured into the mold (10), the top cover plate (13) may be clamped to the cavity pan (11) to close the mold (10). The top cover plate (13) provides a flat back to the polymeric plate (21), and preferably, it also contacts the ends of the pins (22) and the metal bushings (23) while the polymeric material is curing in the mold (10). It is generally preferred to have the ends of the pins (22) contact the cover plate (13) so that when the polymeric plate (21) is mounted on the drum (20), the embedded end of the pins (22) will closely bear on the drum (20) to help withstand the shear forces on the pins (22) during the fissuring process.

In accordance with the preferred method of this invention, the flexible, resilient polymeric plate (21) is removed from the master mold (10), with the pins (22) and metal bushings (23) embedded therein, before the polymeric material has been completely cured. The silicone rubber mold (12) is removed from the pins, and the partially cured polymeric plate (21) is then placed on a curved surface having the proper radius (slightly less than the rotary drum), it is temporarily secured thereto by clamping the land area (16) which surrounds the plate (21), and the curing of the polymeric material is completed. The mold (12) may be reused to make additional polymeric plates. It is preferred to mold and form the flexible, resilient polymeric plates (21) slightly undersized whereby they are slightly stretched into place on the rotary drum with clamps to eliminate the join lines. The polymeric plates (21) with the embedded pins (22) are firmly attached to the rotary drum or roll (20) through the holes in the metal bushings (23) using either screws or high tensile pop rivets (24). The bushings (23) are embedded in the polymeric plates (21) to minimize cold flow of the polymeric plate (21) when fastened to the rotary drum (20).

The headless pins (22) may be either pointed or have straight shafts. Pointed pins have been used because they are readily available in this form. As practiced, the non-pointed end has been placed in the holes (14) in the silicone rubber mold (12) whereby the pointed end is embedded in the urethane polymer. It is believed that having a straight (non-pointed) end embedded in the urethane polymer would be preferable because the straight shaft would provide added bonding area for the urethane polymer.

As previously described, the polymeric material in which the fissuring pins are embedded is flexible and resilient. This allows the pins to move slightly and aids the pins in the entry and exit from the acoustical ceiling panels to which the fissure pattern is being applied. However, the polymeric material used in this invention is not compressible, thereby distinguishing it from the elastomeric sponge rubber layer used as a stripper means in the apparatus disclosed in U.S. Pat. No. 3,470,978. Examples of polymeric materials are epoxy resins and urethane polymers or copolymers.

Figure 2:
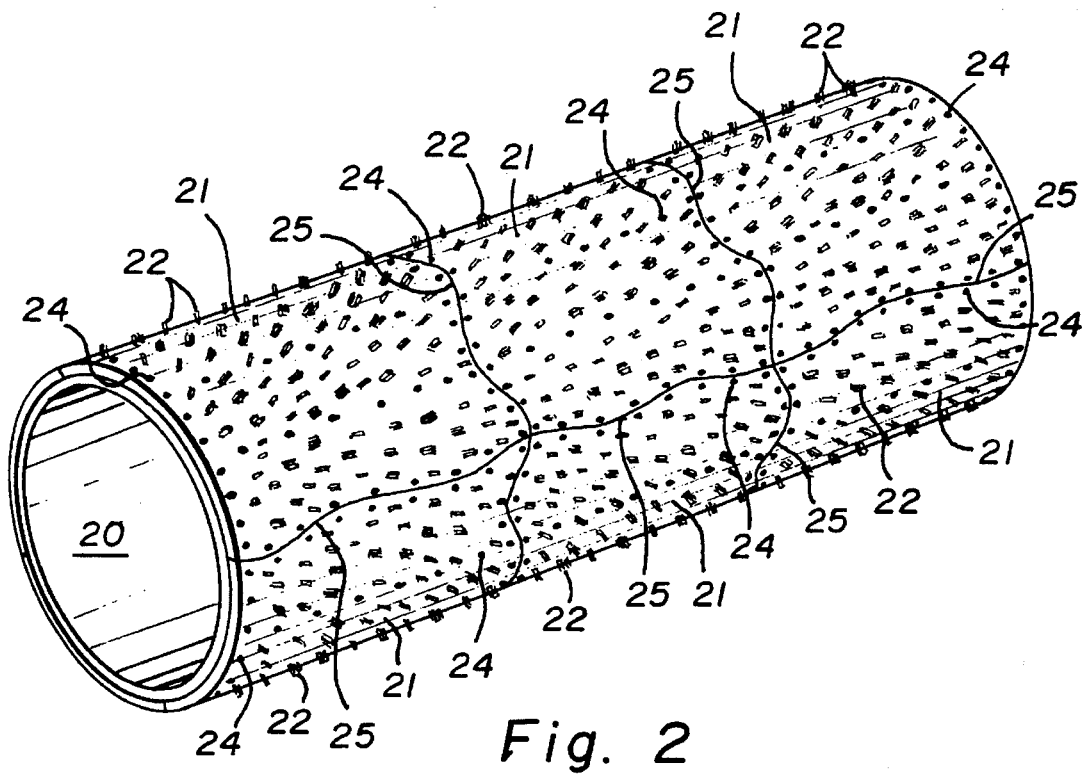
FIG. 2 is an isometric view of the rotating drum covered with several flexible, resilient polymeric plates with the pins embedded therein.
Figure 3:
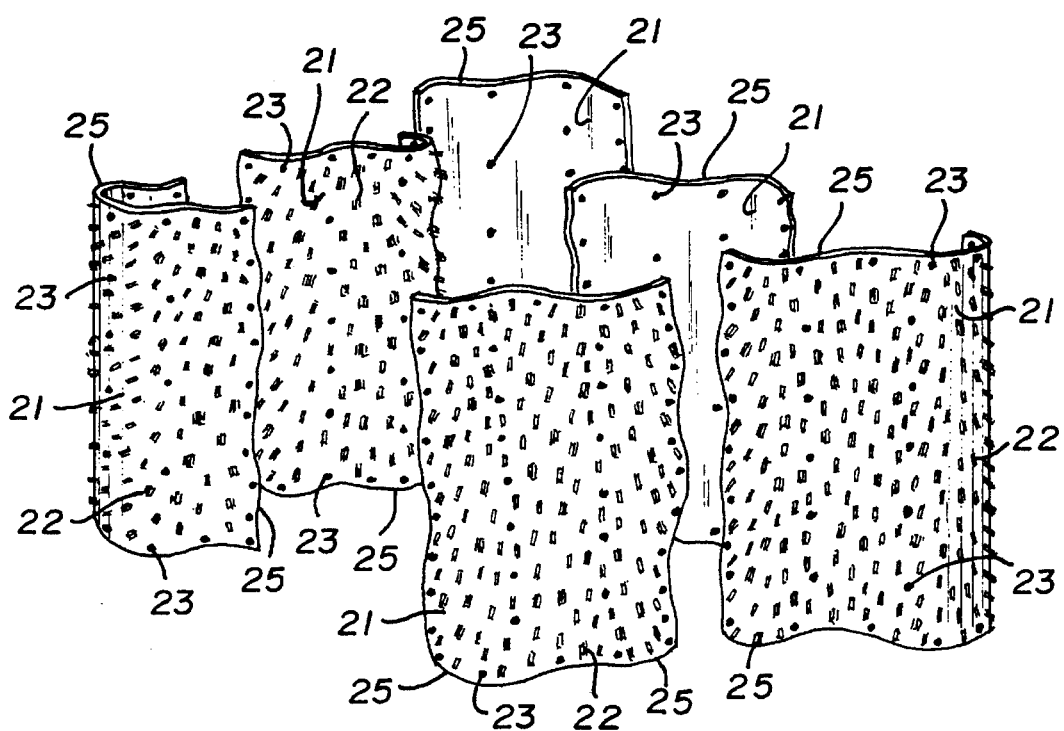
FIG. 3 is an isometric view of several flexible, resilient polymeric plates with the pins embedded therein standing alone in an unassembled condition.

Referring now to FIGS. 2 and 3, there is illustrated a rotary drum (20) which is covered by 6 plates (21) of flexible, resilient polymeric material. Each of the plates (21) has fissuring pins (22) embedded therein, and as shown in FIG. 3, metal bushings (23) are embedded along the edges and in the field of each plate. FIG. 2 shows the polymeric plates (21) attached to the rotary drum (20) by means of screws or rivets (24) placed in the metal bushings or mounting bosses (23). As shown in both FIGS. 2 and 3, the flexible, resilient polymeric plates (21) have scalloped edges (25) which provide for engaging the edges (25) of the plates (21) in a manner which preserves pattern continuity.

Figure 4:
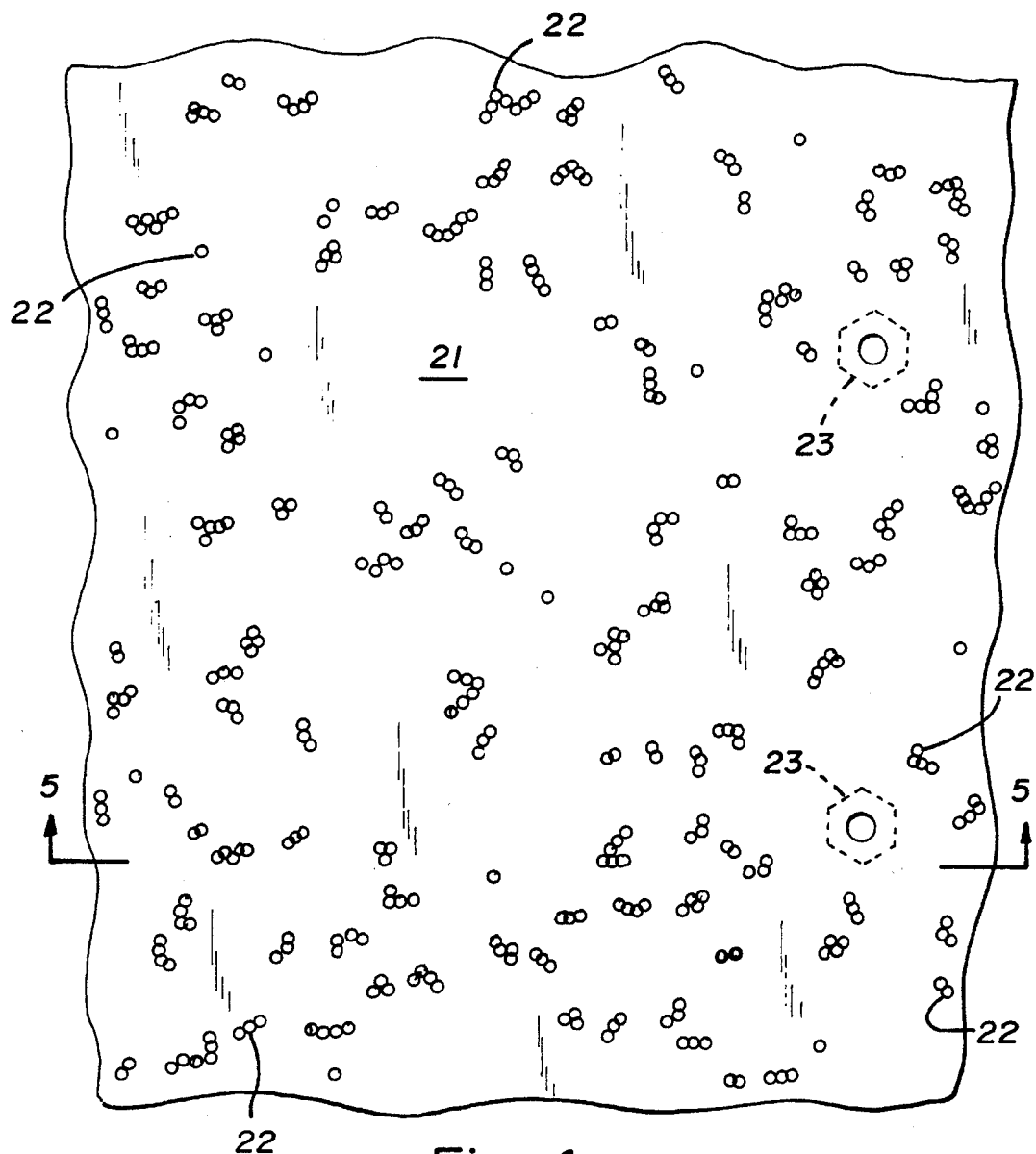
FIG. 4 is an enlarged view of the surface of a flexible, resilient polymeric plate illustrating the adjacent, contiguous pin arrangement and metal bushings or mounting bosses embedded therein.

FIGS. 4 and 5 illustrate the adjacent, contiguous pin arrangement in accordance with a pre-selected fissure pattern. The steel pins (22) are arranged in groups of varying numbers of pins, ranging from 1 to 8 in FIG. 4, however, more than 8 pins in a group may be used if desired.

EXAMPLE

Fissure plates with steel pins embedded in the polymeric matrix were prepared for placement on a rotary drum used to produce a fissured, acoustical ceiling panel. Heat-treated, high carbon steel pins having a quarter inch taper to a point were used. The steel pins had a diameter of 0.030 inches and a length of 0.425 inches. Steel hex nuts were used as the metal bushings or mounting bosses which were also embedded in the polymeric material.

A two part urethane polymer ("CONATHANE TU-900") was used as the polymeric material. After the initial mixing of the polymer, it had a viscosity of 3000 cps at 25° C. The urethane polymer was specified as having a Shore A durometer hardness of 90 after a 7 day cure at 25° C. A two part, sprayable primer (CONAP AD-6, a modified polyvinyl butyral resin with a phosphoric acid catalyst) to promote adhesion of the polyurethane to the steel pins and bushings was also used.

Initially, a flat silicone rubber mold was produced with holes in the mold which defined the fissure pattern. The holes were designed to accommodate the steel pins snuggly and to allow the pins to extend one quarter inch above the mold face. The silicone rubber mold was placed in a metallic container which had vertical sides extending one quarter inch above the mold face. The silicone rubber mold was loaded by inserting the steel pins until all of the holes were filled. The tapered end of the pins can either be inserted into the silicone rubber mold or left exposed whereby it is embedded in the polyurethane material, depending upon the requirements of the fissure pattern produced in the acoustical ceiling panel. In this case, the tapered ends were exposed, and approximately 8500 pins were inserted in the mold.

After all of the steel pins were placed in the holes, the primer (CONAP AD-6) was sprayed on the pins and the surface of the mold. The bushings were also sprayed with the primer and were placed on the mold face at the desired attachment points. The primer held the bushings in place on the silicone rubber mold and required about one hour at room temperature to dry.

Then, the two part urethane polymer (CONATHANE TU-900) was mixed and catalyzed. The liquid urethane polymer was poured in the master mold container to fill it with polymer to the top of the container. A flat plate was clamped onto the top of the mold container to close the master mold and define the thickness of the flexible, resilient polyurethane material at one quarter inch. The cover plate also provided a flat back on the polyurethane material.

The polyurethane was partially cured after two hours at room temperature (about 25° C.), at which time the mold was opened, and the green (partially cured) polyurethane fissure plate with the pins and bushings therein was removed from the master mold. The silicone rubber mold was stripped from the polyurethane fissure plate, which at this stage was very flexible. The polyurethane fissure plate was draped, backside down, over a curved form of the desired radius (5 5/16"). The axial edges of the polyurethane fissure plate were clamped to the curved form and it was allowed to cure at room temperature (about 25° C.) for 7 days. Alternatively, the polyurethane resin can be cured at elevated temperature (80° C.) in about 16 hours.

The silicone rubber mold and the master mold container were designed to provide a one inch land area around the perimeter of the polyurethane fissure plate to accommodate edge curl during the final curing step. After complete cure, the land was removed by trimming with a sharp knife. In this case, a scalloped guideline was applied to the polyurethane fissure plate when it was in the mold whereby the land trimming operation could more easily form the scalloped edge. The polyurethane fissure plate had a scalloped edge and final dimensions of 16 13/16 inches axial, 16.71 inches radial and a thickness of 0.25 inches.

Having completely described this invention in accordance with the requirements of 35 U.S.C. 112,

What is claimed is:

1. A method for manufacturing a polymeric plate useful in apparatus for producing a fissured acoustical ceiling panel comprising (1) forming a master mold defining a cavity having a flat bottom and vertical side walls, (2) placing an elastomeric mold within said master mold with said elastomeric mold covering the entire bottom of, and extending to the side walls of, the cavity in the master mold and having a thickness such that the side walls of the cavity extend above the elastomeric mold a fraction of an inch, said elastomeric mold having holes pre-formed therein in a pre-selected pattern, (3) placing pins endwise partially into the holes in the elastomeric mold so as to leave one end of the pins exposed from the elastomeric mold, (4) placing metal bushings on said elastomeric mold, (5) pouring a liquid polymer into the master mold to fill it and cover the exposed ends of the pins and the metal bushings, (6) placing a cover plate over the master mold to close the mold, (7) firmly attaching the cover plate to the master mold, (8) partially curing the liquid polymer for a duration long enough to solidify the polymer whereby it is handleable, (9) removing the partially cured polymeric plate from the master mold, (10) removing the elastomeric mold from the pins, (11) placing the partially cured polymeric plate on a curved form having a desired radius, (12) firmly attaching the polymeric plate to the curved form, (13) completely curing the polymeric plate on the curved form, and (14) removing the cured, curved polymeric plate from the form.

2. A method in accordance with claim 1 wherein a primer is applied to the pins and the metal bushings prior to pouring the liquid polymer into the mold in order to promote the adhesion of the polymer to the metal pins and bushings.

3. The method of claim 1 wherein the elastomeric mold is a flat silicone rubber mold with holes which define a fissure pattern, said holes having a depth ranging from about 1/8 inch to about 3/8 inch.

4. The method of claim 1 wherein the vertical side walls of the master mold extend above the elastomeric mold about 1/4 inch.

5. The method of claim 1 wherein the liquid polymer is a urethane polymer.

6. The method of claim 1 wherein step (3) there are about 8500 pins placed in the holes in the elastomeric mold.

7. The method of claim 1 wherein the holes in the elastomeric mold are arranged so that some of the pins are placed in adjacent and contiguous relationship.

8. The method of claim 1 wherein the master mold and the elastomeric mold are designed to provide a land area around the outer perimeter of the formed polymeric plate.

9. The method of claim 8 wherein after the cured, curved polymeric plate is removed from the form, the land area is removed by trimming.

10. The method of claim 9 wherein the land area is trimmed so as to provide a scalloped edge on at least one edge of said curved polymeric plate.

11. In an apparatus for applying a fissured pattern to an acoustical panel wherein a rotary drum is used to provide fissure shaped perforations in a surface of the panel, the improvement comprising a plurality of cylindrical pins affixed to and extending substantially radially outward from the surface of the rotary drum, at least some of said pins being disposed in groups of pins, the pins within each group being arranged in parallel side-by-side contiguous relationship to form an elongated projection for producing a fissure shaped perforation in the surface of the acoustical panel when the apparatus is rotated against said panel surface.

12. The apparatus of claim 11 further comprising a plurality of flexible, resilient polymeric plates attached to the rotary drum, wherein said pins are partially embedded endwise in said polymeric plates with the exposed ends of the pins extending outward from said plate to provide the fissure shaped perforations to the panel.

13. The apparatus of claim 12 further including means embedded in said polymeric plates for attaching the plates to the rotary drum.

14. The apparatus of claim 11 wherein substantially all of said pins are of the same size and shape.

15. The apparatus of claim 14 wherein the diameter of said pins is on the order of 0.030 inches.

16. The apparatus of claim 12 wherein the length of the exposed ends of the pins ranges from about 1/8 to about 3/8 inch.

17. The apparatus of claim 12 wherein the polymeric material used to form the flexible, resilient polymeric plates is a urethane polymer.

18. The apparatus of claim 12 wherein there are 6 polymeric plates attached to the rotary drum, and said plates have scalloped edges to facilitate an interlocking engagement.

19. The apparatus of claim 18 wherein there are on the order of 8,500 pins in each polymeric plate.

* * * * *